INVENTOR
ARTHUR L. INGALLS
BY
*Barnes, Kisselle, Raisch & Choate*
ATTORNEYS

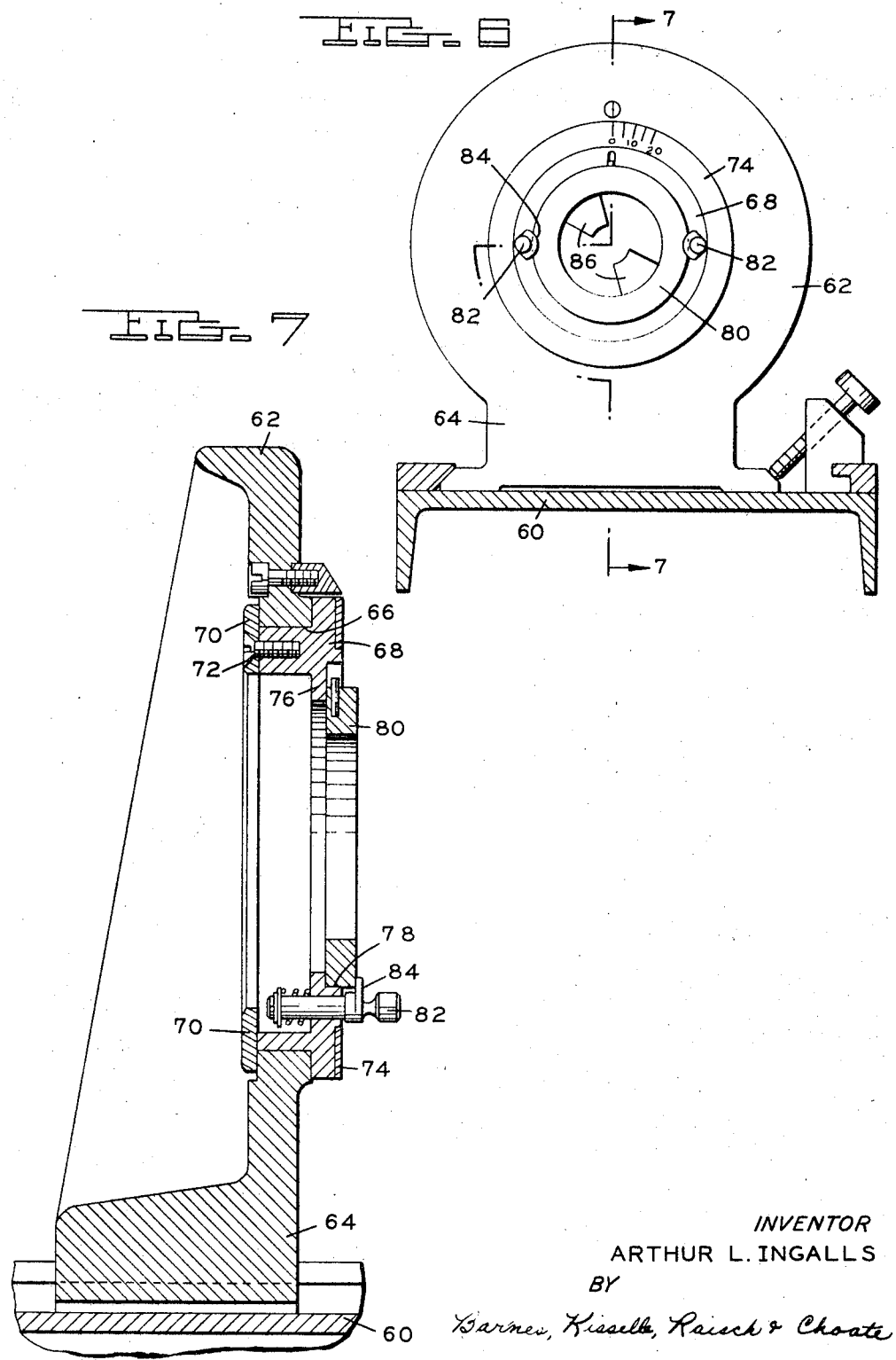

United States Patent Office 3,424,512
Patented Jan. 28, 1969

3,424,512
OPTICAL SPATIAL FILTERING WITH ENLARGED FREQUENCY SPECTRUM PLANE
Arthur L. Ingalls, Ann Arbor, Mich., assignor to Conductron Corporation, Ann Arbor, Mich., a corporation of Delaware
Filed Apr. 27, 1964, Ser. No. 362,800
U.S. Cl. 350—162
Int. Cl. G02b 5/18
4 Claims

ABSTRACT OF THE DISCLOSURE

An improved optical system for two-dimensional filtering utilizing a coherent light source to create a plane wave front and an optical system to create a transform of input data illuminated by the light source, wherein the transform of the data is enlarged to facilitate a filtering operation to remove selected frequencies and orientations and subsequently the reconstruction image is enlarged to provide a practical reconstruction size, the entire system being constructed to provide an optimum size spectral area with a minimum optical path length.

This invention relates to a method and apparatus for optical spatial filtering in which a transparency bearing certain data is illuminated with a coherent light in the form of a plane wave front and the light output is specifically filtered to produce an image which is similar to the subject transparency with certain information intentionally removed by using a spatial filter.

The invention further relates to a two-dimensional optical filter and has as one object the provision of an optical system which permits convenient examination of the frequency diffraction spectrum of the subject transparency as well as convenient location and positioning of a spatial filter for eliminating frequencies and orientations which are desired to be removed prior to the reconstruction.

It is a further object to provide an optical system which is materially shorter than previous systems to conserve space and cost in the preparation of practical equipment for spatial filtering.

A further object is the use of an optical system for the above purposes utilizing a monochromatic laser light source as the prime illumination.

Another object is the utilization of a short focal length objective for changing a frequency scale to facilitate spatial filtering and manipulation.

Another object is the use in an optical filtering system of a transform enlarging lens and an image enlarging lens in combination with a transform objective and a reconstruction objective of relatively short focal length.

A further object of the invention is the provision of means for adjusting the magnification of a final filtered image to permit ready examination and also relatively simple recording by photographic means.

Other objects and features of the invention relating to details of construction and operation will be apparent in the following description and claims.

Figure 1:
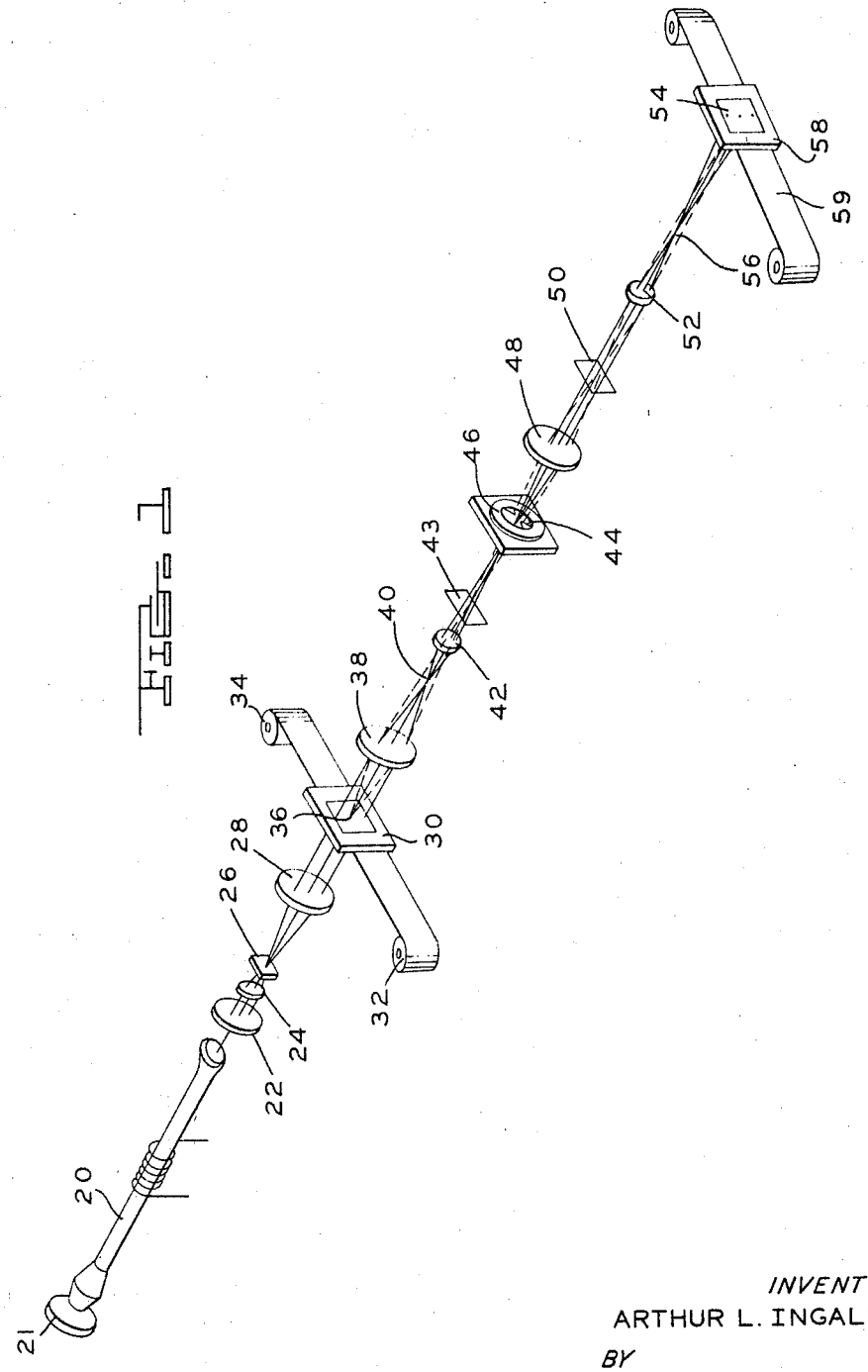

Drawings accompany the disclosure and the various views thereof may be briefly described as:

FIGURE 1, a composite diagrammatic presentation of an optical system for accomplishng the purposes of the invention.

Figure 2:
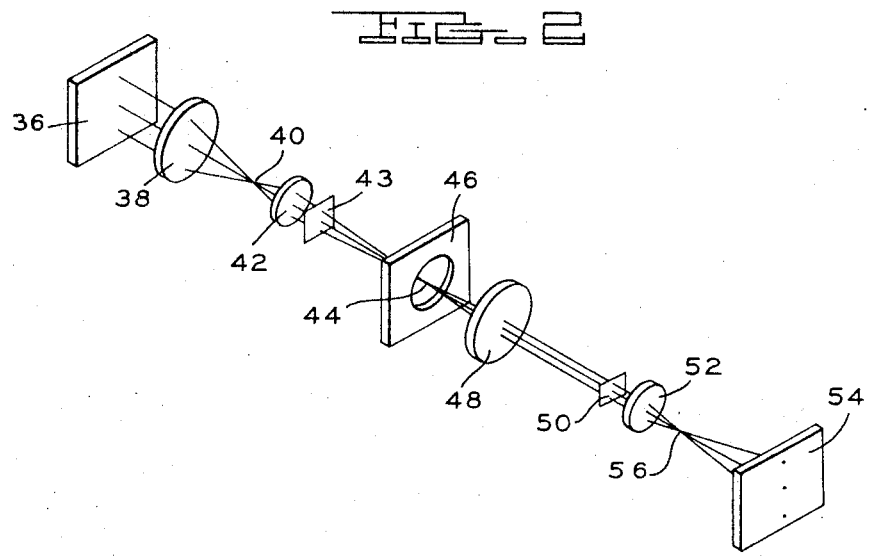

FIGURE 2, a breakdown of the portion of the optical system showing the frequency plane rays.

Figure 3:
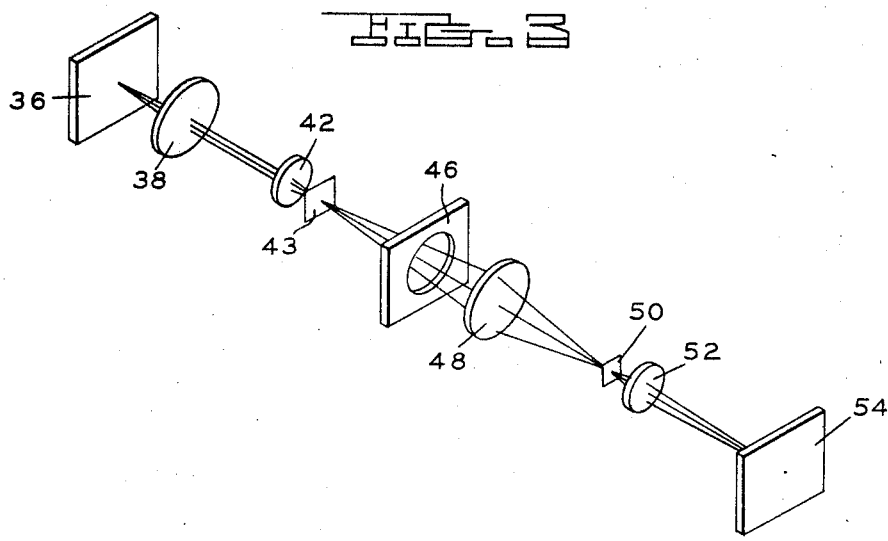

FIGURE 3, a breakdown of a portion of the optical system showing the picture plane rays.

Figure 4:
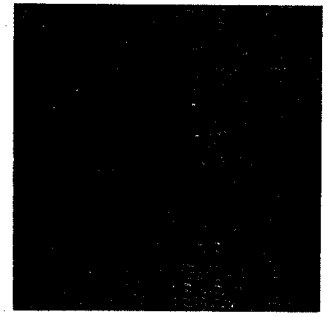

FIGURE 4, a view of objective data which may be filtered on the system shown.

Figure 5:
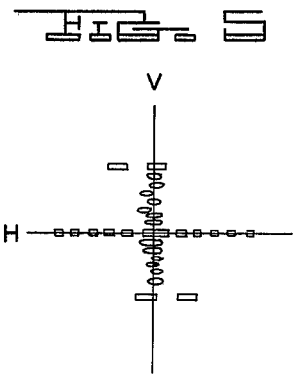

FIGURE 5, a view of a frequency diffraction spectrum which is created by the optical system at one portion thereof.

FIGURE 6, a view of a filter and holder which may be used in connection with the data and frequency spectrum of FIGURES 4 and 5.

FIGURE 7, a sectional view on line 7—7 of FIGURE 6.

In a science known as optical spatial filtering, use is made of the optical phenomenon sometimes referred to as a Fourier transform. Basically, this involves passing coherent monochromatic light through a diffraction grating and then through a lens system wherein the plane wave fronts of the light passing through the grating are concentrated according to their frequencies and directions at definite points in what is called a frequency diffraction spectrum. The mathematical formula for this is generally written in the following form:

$$F(W_x W_y) = \iint f(x,y) e^{j(W_k X + W_y Y)} dx dy$$

In general, it can be said that the light maxima or spots which develop in the spectrum plane indicate definite concentrations of spatial frequencies or of direction in the diffraction grating. The farther the points are from the center of the spectrum, the higher the frequency. The angle from the vertical or horizontal is a measure of the direction of the data. The treating of spatial wave data may involve a number of signals having different frequencies superimposed and reproduced on a single plane transparency in the form of light and dark lines. This can constitute the equivalent of a diffraction grating.

As one example of a known use, a photograph of the waves of a body of water taken from certain altitudes may record a plurality of waves moving in different directions, one being superimposed on the other. By subjecting a transparency of this picture to a source of light and introducing it into the optical system to be described, the frequencies and directions of these waves can be picked up in a diffraction spectrum, and if it is desired, some frequencies can be filtered out leaving others enhanced in the reconstructed image.

In the embodiment shown in FIGURE 1, the illumination section or light source is an important portion of the optical system for the two-dimensional optical filtering. A laser light source 20 is shown with appropriate optical transparent mirrors 21 and 22 and the lenses 24 and 28 for expanding the size of the parallel beam and therefore the wave front of the source. The illumination element 20 consists of a neon-helium gas laser with lens 24 to condense the light beam to a point and then a pin hole shield 26 to select a single laser spatial mode.

The laser unit 20 is a sealed gas tube containing neon-helium gas with angled end plates which are optically flat through which light may pass. This tube, together with the transparent mirrors 21 and 22, is referred to as Fabry-Perot etalon cavity.

A collimator 28 is utilized to render the light parallel again to provide a plane wave front of illumination. The laser objective 24 and the collimator 28 are separated by the sums of the focal lengths when parallel light is produced by the laser, or separated by a different distance when the laser is operated in a configuration which produces a spherical wave front rather than a plane wave front. In either case, the pin hole shield 26 is placed at a point focus of light coming from the laser objective. This type of illumination section produces a plane wave front perpendicular to the optical axis and suitable for providing illumination in the form of a plane wave to the two-dimensional optical filtering system. While it is possible to utilize other light sources of monochromatic nature, the laser system described is preferred.

The optical filter section of the system starts beyond the collimator 28 with an object plane at which is located a transparency holder 30 which can be utilized for a single piece of transparency film or a continuous piece carried on rollers 32, 34. Utilizing the holder 30 a section of transparency 36 can be mounted and properly positioned in the optical plane and held stationary for a sufficient period to perform what functions are desired on it.

Beyond the object plane at the holder 30 is a transform objective 38 which produces a Fourier transform of the light emerging from the object transparency 36 at the first frequency plane of the optical circuit, this plane being located in space at 40. A transform enlarging lens 42, adjustable laterally and vertically, creates a first aerial image at 43 on the axis of the system and has the function of radially spreading the frequency information at the second frequency plane located at 44 where there is positioned a filter frame 46 which will be described in greater detail later. The spreading of this information at the second frequency plane reduces the positional sensitivity of any spatial filtering function accomplished at the frame 46. In a sense, this might be called a magnification which renders motion in the frequency plane relative to the axis of the optics less critical.

Beyond the second frequency plane is positioned a reconstruction objective 48 for the purpose of producing a reconstructed image of the object transparency absent any information due to any filtering operation accomplished at 46. This image, also sometimes referred to as an aerial image, occurs in space at 50 and also passes through an image enlarging lens 52, the purpose of which is to change the size of the filtered image back up to the original size or to a size which can be advantageously viewed or photographed with suitable photographic materials at a filtered image plane 54. Between the objective 52 and the viewing plane 54 is a third frequency plane 56 located in space. A frame 58 serves to hold a film 59.

As previously explained, the function of a diffraction grating, together with a transform objective, is to create a frequency diffraction spectrum where wave lengths of the same frequency and directional alignment will tend to accumulate and reinforce each other to create what might be referred to as "bright spots" or "points of concentration" (maxima) positioned outwardly and at certain angles to the axis of the spectrum which is selected for purposes of reference.

Where a transparency, which in this case serves as the grating, is composed of lines which are multiplied at certain frequencies and also disposed at various angles, it is possible to detect in the spectrum of the transparency certain points of frequency disposed relative to any selected axis at certain distances away from the center which is the direct current point commonly called DC, and also at angles away from the point of reference. This spectrum can be observed visually by the eye at the second frequency plane 44 where there is located a holder for a spatial filter. In analyzing any transparency, therefore, the spectrum is examined and it is possible to pass or block out certain frequencies or directions in the spectrum by placing a filter at the second frequency plane. In some cases, this can be what is called a pass filter which passes certain frequencies or directions that can be reconstructed again in the lines which formed it, or in some cases it may be a rejection filter which blocks off certain frequencies and passes the remainder. Thus, with suitably shaped masks or transparencies, the reconstructed image of the transparency can be viewed and photographed if desired with only part of the frequencies or orientations reconstructed.

As an example of this, in FIGURE 4, a transparency is shown which has been obtained from a source of information. It will be noted that this has a number of lines many of which are repetitive and some going in some directions and others at angles thereto. In FIGURE 5, the frequency spectrum for this transparency is shown where there are two relatively bright spots at the upper left and the lower right of the vertical reference line (V). A filter as shown in FIGURE 6 can be developed to block out a pair of these bright spots at a certain angle and the reconstructed image will thus not have the frequency lines that originally formed the eliminated spots in the spectrum.

The devices as above described can be used for a number of different purposes. One has previously been mentioned, that is, the analysis of the waves of the sea in a picture taken as an aerial photograph. If there are waves coming from a multiplicity of directions which are crossing each other and create a composite group of waves, these waves having a particular frequency and direction, can be analyzed in the spectrum and some of them filtered out to leave a clearer picture of those remaining. Other uses of the devices include analysis of seismic data, rock strata, aerial photographs, watershed photos, and the like.

Two-dimensional optical filters have heretofore been made with lenses of very long focal length in order to produce a spatial filtering plane large enough to permit easy fabrication of spatial filters. Reconstructive objectives have also been of very long focal length in order to obtain a filtered image of useful size. For this reason, two-dimensional filters have become quite long in the nature of 20 to 25 feet and some of the lenses have been quite large. The system described has the advantage that the optical section occupies perhaps a total of 2 to 3 feet as compared with 7 or 8 feet in previous devices so that the total system can occupy perhaps 10 feet compared to 20 to 25 feet previously.

In FIGURE 2, the frequency plane rays have been shown to clarify this aspect of the device. The object plane at 36 passes collimated light to the transform objective 38 and the first frequency plane occurs at 40. Transform enlarging lens 42 creates the first aerial image 43 and the second frequency plane at 44. The reconstruction objective 48 creates a second aerial image 50 which passes through the enlarging lens 52 through a third frequency plane 56 to the filtered image 54. Similarly, in FIGURE 3, the same parts are shown with the picture plane rays illustrated so that it will be seen that the first aerial image 43 appears beyond the transform enlarging lens 42 and the second aerial image appears at 50 between the reconstruction objective 48 and the enlarging lens 52. As an example of the magnifications involved, in FIGURE 3, from the original objective 36 to the first picture plane 43, there may be a .4 magnification, and from the first image 43 to the second image 50 there may be a .625 magnification making a total overall magnification from 36 to 50 of .25. Accordingly, the magnification from 50 to 54 is required to be 4.0 to bring the filtered image back to the original size of the original data image.

It will be appreciated that while in the above description mention has been made of either passing or masking information, that it is also possible to let frequency data through in altered form and then getting reconstruction which includes some of the original material unaltered and other of the original material altered. For example, this alteration may include simply a change in the phasing of the light to some fraction of a wave length.

It may also be of interest to the disclosure to designate the type of lenses that are used in one example of an operating system of the type shown in FIGURES 1, 2 and 3. It will be appreciated that the means of holding the lenses is standard and suitable means would be provided to position these lenses on a suitable optical bench with necessary adjustment holders along the lines of those shown in FIGURES 6 and 7.

In particular reference to FIGURE 1, the laser objective lens 24 is a 16 mm. microscope objective. The collimator 28 is a 152 mm. f/2.8 photographic objective lens. The transform objective 38 is a relatively short focal length lens such as 100 mm. $f/2.3$ photographic objective lens. The transform enlarging lens 42 is a 75 mm. $f/2.3$ photographic objective lens, and the reconstruction objective 48 is a 100 mm. $f/2.3$ photographic objective lens. The last lens in the series, the image enlarging lens 52, is a 40 mm. $f/2.3$ photographic objective lens. This combination of lenses in the optical circuit has produced successful filtering operations on a relatively short optical bench.

In FIGURE 6, an optical table or bench 60 has locked thereon a mount ring 62 with a foot portion 64 suitably fastened to the bench. Ring 62 has a circular opening 66 (see FIGURE 7) and carries an annular ring mount 68 having a slip fit in the opening 66 and held in place by a lock ring 70 attached by screws 72. On the outer face of the flanged ring 68 is a graduated dial 74. Ring 68 also has an inner annular flange 76 which is annularly grooved at 78 to provide a rotatable bearing seat for a replaceable filter ring 80. Opposed spring plungers 82 having a small cam latch 84 are utilized to lock the filter rings 80 in place. A number of different rings can be available for quick positioning by use of the plungers 84. The particular ring 80, shown in FIGURE 6, holds two wedge-shaped filters 86 which could be used, for example, in connection with the filtering operations above described.

I claim:

1. In an optical system for creating a Fourier transform and a filtered reconstruction of subject data,
  (a) means forming a coherent monochromatic light source,
  (b) a wave front enlarging optical system for said light source comprising a condenser lens, means forming a pin hole, and a collimating lens to provide a collimated beam of light from said source,
  (c) means for mounting a section of spatial wave data in the path of said beam of light to serve as a complex diffraction grating in the system,
  (d) a transform objective to establish a frequency spectrum transform plane of the data,
  (e) a transform enlarging objective for changing the frequency scale of said transform plane to produce an enlarged transform plane of optimum size spectral area with minimum optical path length,
  (f) a spatial filtering mechanism for selectively holding and adjustably positioning a plurality of spatial filtering devices at said enlarged transform plane to permit filtering of unwanted frequencies from said data,
  (g) a reconstruction objective for recreating a data image beyond said enlarged transform plane, and
  (h) a second reconstruction objective for enlarging said filtered data image to a final image for observation.

2. In an optical system for creating a Fourier transform and a filtered reconstruction of subject data,
  (a) a light source system forming a coherent beam of light,
  (b) means for mounting a section of spatial wave data in the path of said beam of light to serve as a complex diffraction grating in the system,
  (c) a transform objective to establish a frequency spectrum transform plane of the data,
  (d) a transform enlarging objective for changing the frequency scale of said transform plane to produce an enlarged transform plane of optimum size spectral area with minimum optical path length,
  (e) a spatial filtering mechanism for selectively holding and adjustably positioning a plurality of spatial filtering devices at said enlarged transform plane to permit filtering of unwanted frequencies from said data,
  (f) a reconstruction objective for recreating a data image beyond said enlarged transform plane, and
  (g) a second reconstruction objective for enlarging said filtered data image to a final image for observation.

3. In an optical system for creating a Fourier transform and a filtered reconstruction of subject data,
  (a) means forming a coherent monochromatic light source,
  (b) a wave front enlarging optical system for said light source comprising a condenser lens, means forming a pin hole, and a collimating lens to provide a collimated beam of light from said source,
  (c) means for mounting a section of spatial wave data in the path of said beam of light to serve as a complex diffraction grating in the system,
  (d) a transform objective to establish a frequency spectrum transform plane of the data,
  (e) means including a transform enlarging objective for changing the frequency scale of said transform plane to produce an enlarged transform plane of optimum size spectral area with minimum optical path length,
  (f) a spatial filtering mechanism for selectively holding and adjustably positioning a plurality of spatial filtering devices at said enlarged transform plane to permit filtering of unwanted frequencies from said data,
  (g) a reconstruction objective for recreating a data image beyond said enlarged transform plane, and
  (h) means including a second reconstruction objective for enlarging said filtered data image to a final image for observation.

4. In an optical system for creating a Fourier transform and a filtered reconstruction of subject data, an improved two-dimensional optical system which comprises:
  (a) a laser including a Fabry-Perot etalon cavity to serve as a source of coherent monochromatic light,
  (b) means to create a point source of said light,
  (c) a collimator in the path of said light to create a plane wave front illumination,
  (d) means to position a spatial data transparency to receive light from said collimator,
  (e) a transform objective positioned to receive light from said collimator as altered by a data transparency and to establish a first frequency plane,
  (f) a transform enlarging objective to form a first aerial image and an enlarged frequency spectrum at a second frequency plane to produce an optimum size spectral area with minimum optical path length,
  (g) a spatial filtering mechanism for selectively holding and adjustably positioning a plurality of spatial filtering devices in said enlarged transform plane to filter out unwanted frequencies from said data,
  (h) a reconstruction objective for recreating a second aerial image of said filtered data beyond said enlarged transform plane, and
  (i) a second reconstruction objective to create a third frequency plane and a final enlarged reconstruction image of said filtered data for observation.

References Cited

UNITED STATES PATENTS 2,929,922  3/1960  Schawlow et al. _____ 331—94.5
3,240,108  3/1966  Lehan et al. _____ 88—1

OTHER REFERENCES

Cutrona et al.: IRE Transactions on Information Theory, June 1960, pp. 386–400 (Scientific Lib. Call No. Q350.I2).

DAVID SCHONBERG, *Primary Examiner.*

RONALD J. STERN, *Assistant Examiner.*

U.S. Cl. X.R.

88—1